US009356959B2

(12) United States Patent
Amoroso et al.

(10) Patent No.: US 9,356,959 B2
(45) Date of Patent: *May 31, 2016

(54) SYSTEM AND METHOD FOR MONITORING NETWORK TRAFFIC

(71) Applicant: AT&T Intellectual Property II, L.P., Atlanta, GA (US)

(72) Inventors: Edward Amoroso, Andover, NJ (US); Albert Greenberg, Summit, NJ (US); Balachander Krishnamurthy, New York, NY (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 76 days.

This patent is subject to a terminal disclaimer.

(21) Appl. No.: 14/519,367

(22) Filed: Oct. 21, 2014

(65) Prior Publication Data

US 2015/0047047 A1    Feb. 12, 2015

Related U.S. Application Data

(63) Continuation of application No. 13/741,135, filed on Jan. 14, 2013, now Pat. No. 8,898,785, which is a continuation of application No. 12/653,135, filed on Dec. 9, 2009, now Pat. No. 8,375,447, which is a continuation of application No. 11/206,713, filed on Aug. 17, 2005, now Pat. No. 7,657,735.

(60) Provisional application No. 60/602,789, filed on Aug. 19, 2004.

(51) Int. Cl.
*G06F 12/14* (2006.01)
*H04L 29/06* (2006.01)
*H04L 12/26* (2006.01)
*H04L 29/12* (2006.01)

(52) U.S. Cl.
CPC ........ *H04L 63/1491* (2013.01); *H04L 12/2602* (2013.01); *H04L 29/12009* (2013.01); *H04L 29/12783* (2013.01); *H04L 43/00* (2013.01); *H04L 61/35* (2013.01); *H04L 63/0272* (2013.01); *H04L 63/1408* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 6,088,804 A | 7/2000 | Hill et al. | |
| 6,647,400 B1 | 11/2003 | Moran | |
| 6,760,420 B2 | 7/2004 | Heilmann et al. | |
| 6,775,657 B1 | 8/2004 | Baker | |
| 6,981,155 B1 | 12/2005 | Lyle et al. | |
| 7,412,723 B2 | 8/2008 | Blake et al. | |
| 7,657,735 B2 * | 2/2010 | Amoroso et al. | 713/150 |
| 8,375,447 B2 * | 2/2013 | Amoroso et al. | 726/23 |
| 8,898,785 B2 * | 11/2014 | Amoroso et al. | 726/23 |

(Continued)

OTHER PUBLICATIONS

Niels Provos: "A Virtual Honeypot Framework"; Center for Information Technology Integration, Oct. 21, 2003; XP-002285472.
Joel Spriggs: "Honeypots: Covert Network Security"; Proceedings of the 2004 Ascue Conference, Online! Jun. 6, 2004, XP002347675; Retrieved from the internet on Oct. 3, 2005: URL:http://fits,depauw.edu/ascue/Proceedings/2004/p.162.pdf.

*Primary Examiner* — Kaveh Abrishamkar

(57) ABSTRACT

Described is a method of assigning a network address to a trap, the network address being a dark address of a virtual private network. The network traffic destined for the network address is monitored and a classification of the network traffic is determined. After the classification, a predetermined response is executed based on the classification of the traffic.

20 Claims, 2 Drawing Sheets

(56) References Cited

U.S. PATENT DOCUMENTS

2003/0200463 A1 10/2003 McCabe
2004/0078592 A1 4/2004 Fagone
2004/0255167 A1* 12/2004 Knight .......................... 713/201

* cited by examiner

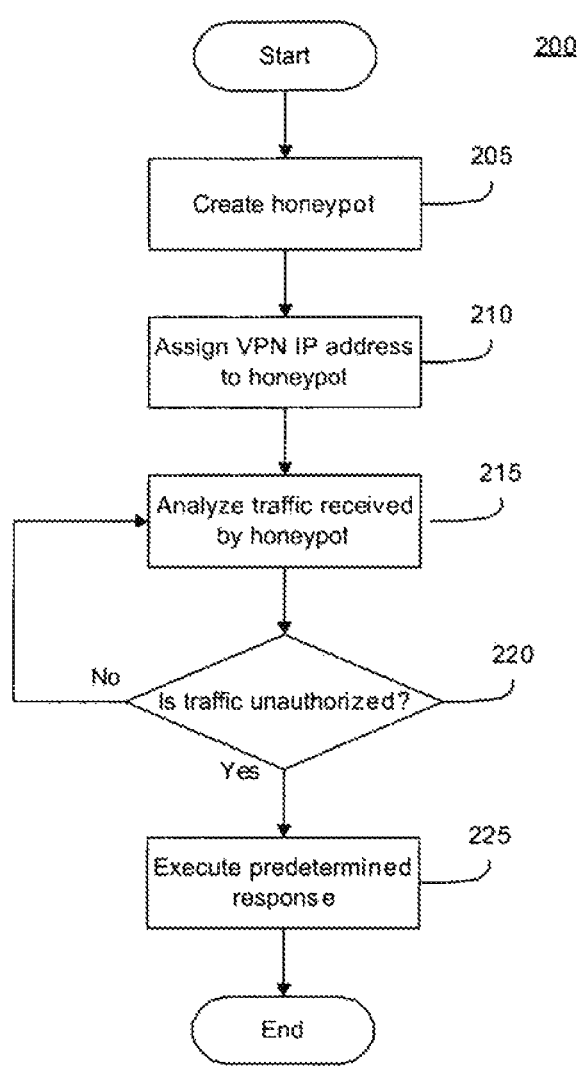

SYSTEM AND METHOD FOR MONITORING NETWORK TRAFFIC

CROSS REFERENCE TO RELATED APPLICATIONS

This application is a continuation of application Ser. No. 13/741,135, entitled "System and Method for Monitoring Network Traffic," filed Jan. 14, 2013, issued on Nov. 25, 2014 as U.S. Pat. No. 8,898,785, which claims priority to application Ser. No. 12/653,135, entitled "System and Method for Monitoring Network Traffic," filed Dec. 9, 2009, now U.S. Pat. No. 8,375,447, issued on Feb. 12, 2013, which claims priority to application Ser. No. 11/206,713, entitled "System and Method for Monitoring Network Traffic," filed Aug. 17, 2005, now U.S. Pat. No. 7,657,735, issued on Feb. 2, 2010, which claims priority to U.S. Provisional Patent Application Ser. No. 60/602,789, entitled "Tailored Security Service Using Dark Prefixes" filed Aug. 19, 2004, the disclosures of which are incorporated, in their entirety herein.

BACKGROUND

Hacking is a major problem facing both network users and providers. An attack by a hacker may be aimed at, for example, reading confidential information, destructing data or preventing a network site from operating properly. Conventional intrusion detection systems have been developed to counteract the attacks, but have, in large part, been unsuccessful due to a diversity and a volume thereof.

The attacks have become an increasingly significant problem in a context of a virtual private network (VPN), which is a controlled section of a public network used by a single customer of the network provider. In using the VPN, the customer desires to avoid costs associated with leased lines in a wide area network, while maintaining a security, quality of service and range of connectivity. Thus, it may be a goal of the network provider to create a secure and cost-efficient environment for the customer which is insulated from attacks by the hackers and any other unauthorized users.

SUMMARY OF THE INVENTION

A method of assigning a network address to a trap, the network address being a dark address of a virtual private network, monitoring network traffic destined for the network address, determining a classification of the network traffic and executing a predetermined response based on the classification.

A system having a server coupled to a first computer network and a second computer network, the server reserving an address space within the second computer network for the first computer network. The system also has a trap installed in the address space for monitoring network traffic to the address space. The server determines a classification for the network traffic and executes a predetermined response based on the classification.

A computer-readable storage medium storing a set of instructions, the set of instructions capable of being executed by a processor, the set of instructions being operable to assign a network address to a trap, the network address being a dark address of a virtual private network, monitor network traffic destined for the network address, determine a classification of the network traffic and execute a predetermined response based on the classification.

BRIEF DESCRIPTION OF THE DRAWINGS

FIG. 2 shows an exemplary embodiment of a method according to the present invention.

DETAILED DESCRIPTION

Figure 1:
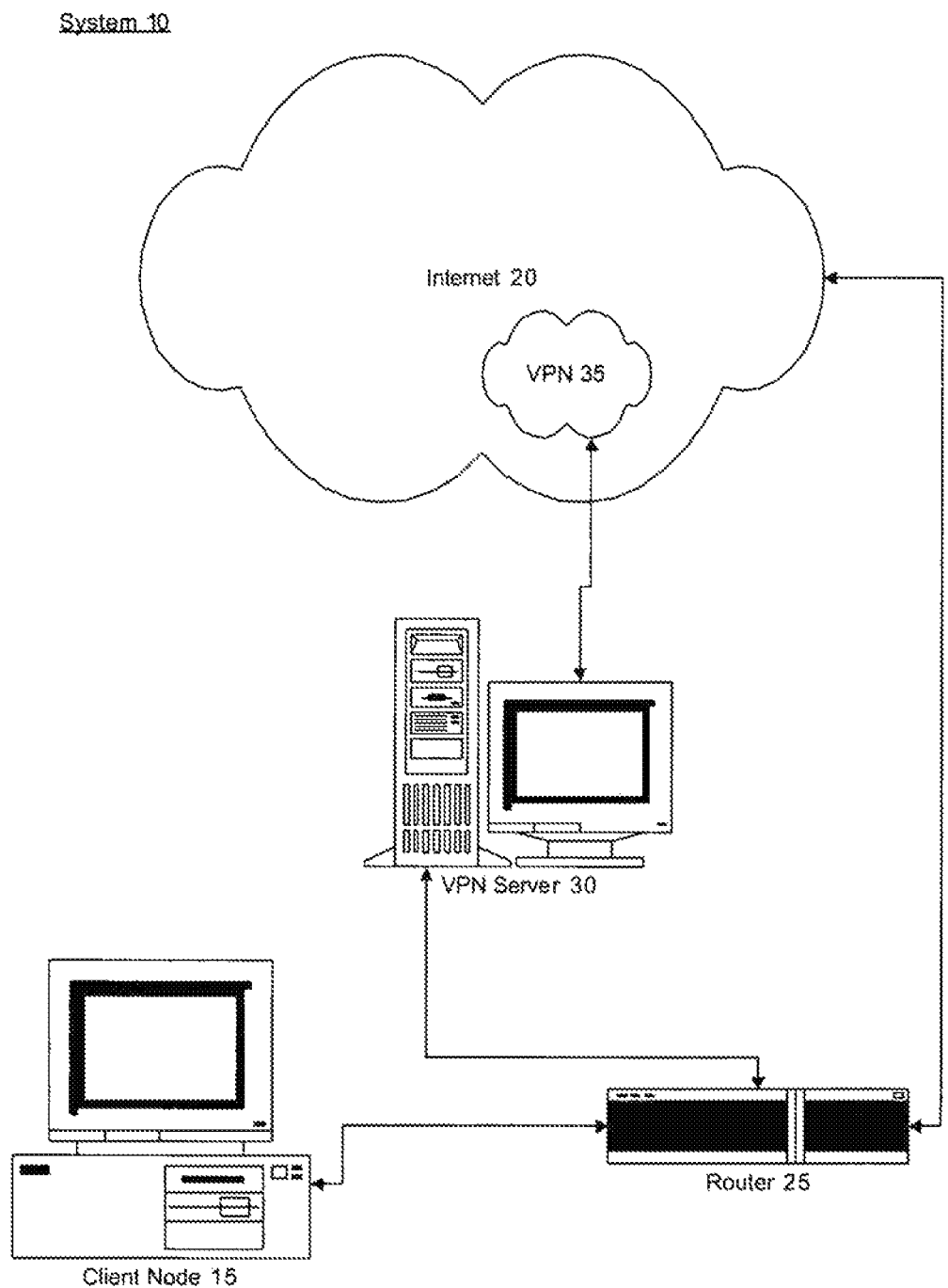
FIG. 1 shows an exemplary embodiment of a system according to the present invention.

The present invention may be further understood with reference to the following description and the appended drawings, wherein like elements are referred to with the same reference numerals. The exemplary embodiment of the present invention describes a system and a method for monitoring network traffic in a computer network. Although, the present invention will be described with respect to a virtual private network (VPN), those of skill in the art will understand that the computer network may be any local/wide area network. In one exemplary embodiment, the present invention provides for identification of unauthorized network traffic which may be data packets addressed to a predetermined address space within the VPN, as will be described below. In another exemplary embodiment, the present invention may monitor and gather data regarding the network traffic to enhance network management and operation.

Traditionally, an entity (e.g., a business) which needed to maintain fast, secure and reliable communications over a large geographical range would utilize a wide area network (WAN). The WAN would be maintained over leased lines (e.g., ISDN, OC3 fiber, etc.) which provided the business with connectivity over the large geographical range. For example, the business may have a headquarters in New York City with satellite offices in Boston, Miami and London and maintain an interconnection between the offices over the leased lines. However, there is a high cost associated with a use of leased lines, and that cost increases as the WAN is expanded. Thus, the business may want to maintain the connectivity and security provided by the WAN, but eliminate the cost and maintenance of the leased lines.

According to the present invention, the business may initiate creation of a virtual private network (VPN) to preserve the connectivity and security for communications with remote offices and users (e.g., employees, clients, etc.). The VPN is a private network which uses a public network (e.g., the Internet) to connect remote sites and/or users together. The VPN uses "virtual" connections routed through the public network from the private network to the remote site and/or user. For example, the business may maintain the private network and contract with a network provider to set up and maintain a VPN server. The network provider then supplies a VPN client software to the remote sites and/or users which are authorized to access the VPN. When the remote site initiates a connection to the VPN, the VPN client software accesses the VPN server and establishes and maintains the connection to the VPN. The VPN server then supports secure, and optionally encrypted, communications between the remote site and the private network.

In operation, the network provider reserves and monitors a total address space (e.g., a predetermined number of Internet protocol (IP) addresses) for the VPN. When the remote site attempts to connect to the VPN, the VPN server will, if the remote site is authorized, assign a VPN IP address thereto. Thus, the VPN server may maintain and recycle the VPN IP addresses for authorized users of the VPN. According to the present invention, the total address space may include a dark address space (i.e., one or more unused VPN IP addresses within the predetermined number of IP addresses). The dark address space may be utilized by the network provider to attract and identify unauthorized traffic to the VPN, as will be described below.

FIG. 1 shows an exemplary embodiment of a system 10 for monitoring network traffic according to the present invention. The system 10 may include a client node 15 (e.g., a wired/wireless computing device) having access to a public network (e.g., the Internet 20). As is known in the art, when the client node 15 connects to the Internet 20 (or any other TCP/IP network), it is assigned an IP address by, for example, an access point or a third-party Internet service provider (ISP). The client node 15 may then access websites hosted on web servers (not shown) connected to the Internet 20. For example, the client node 15 may transmit a request for a website to a router 25 which forwards the request to a web server hosting the website. A connection for data transfer may then be established between the client node 15 and the web server.

According to the present invention, the client node 15 may include a VPN client software installed thereon. When the software is executed, the client node 15 transmits a VPN request to a VPN server 30 via the router 25. Included in the VPN request may be authentication data (e.g., user ID, password, a VPN identifier) used for identifying the client node 15, a user thereof and a VPN 35 which is being accessed. The VPN server 30 may determine whether the user's authentication data is valid (i.e., authorized user of the VPN 35) by, for example, communicating the authentication data with a Radius server (not shown) and/or a Kerberos server (not shown). If the client node 15 is authenticated, the VPN server 30 establishes a connection (e.g., an encrypted tunnel) with the client node 15 using the IP address. The VPN server 30 then assigns the client node 15 a VPN IP address as chosen from a predetermined number of VPN IP addresses which have been reserved for the VPN 35 by, for example, a network provider.

The client node 15 may then communicate with the VPN 35 via the VPN server 30. For example, the client node 15 transmits a data packet to the VPN server 30 over the connection. That is, the packet received by the VPN server 30 from the client node 15 may be encrypted and include the IP address of the client node 15. Upon receipt of the packet, the VPN server 30 decrypts the packet and attaches the VPN IP address for the client node 15 thereto. The packet may then be forwarded by the VPN server 30 to a destination node within the VPN 35. That is, the VPN server 30 is the only node which knows the IP address and/or a location of the client node 15. The VPN server 30 exchanges packets with the client node 15, and redirects the packets to the destination node in the VPN 35. Because of the VPN IP address, devices in the VPN 35 assume that the packets originate from further nodes in the VPN 35 and that those communications are secure. Thus, the VPN server 30 may broker access to the VPN 35 for all the client nodes.

Typically, the VPN 35 is an enticing target for hackers, because it is accessible via the Internet 20. Thus, any computing terminal coupled to the Internet 20 may potentially establish a connection to the VPN 35. Also, the VPN 35 is created to protect one or more resources which may be important to the business. The resource may be the target for the hackers. For example, the resource may be an application, an object, a document, a web page, a file, data, executable code and/or any other type of computational and/or communication-type resource. Thus, the network provider which creates and maintains the VPN 35 has an interest in a management and security thereof to maintain satisfaction of the customer, i.e., the business.

According to the present invention, the VPN 35 may include one or more unassigned VPN IP addresses which may also be referred to as "dark address space." That is, at one time, the VPN server 30 may have one or more VPN IP addresses which have not been assigned to any client nodes or nodes in the VPN 35. The dark address space may be utilized by the network provider to attract, identify and monitor network traffic within the VPN 35. In one embodiment, the dark address space may be utilized to monitor unauthorized traffic which may correspond to activity of hackers and/or misdirected traffic which was not intended for the VPN 35. After the unauthorized traffic has been detected, the network provider may initiate a predetermined response. For example, the connection supplying the unauthorized traffic may be terminated, the connection may be maintained for analysis of a weakness(es) in the VPN 35 and/or the VPN 35 may be taken offline for analysis and/or maintenance.

In another embodiment, the dark address space may be utilized to gather data about the network traffic. For example, the network provider may determine a classification for the traffic for use in further VPNs maintained by the network provider. Also, the data may be utilized to determine a service/resource sought by the traffic. For example, a user may query the VPN for a particular service which is not provided. That is, the traffic may be authorized to access the VPN, but may be directed to the dark address space for non-malicious reasons. The data which is gathered may then be used to enhance security and management of the VPN. Thus, while the present invention will be described with respect to detecting unauthorized network traffic, those of skill in the art will understand that the present invention may be utilized to monitor and gather data regarding any type of network traffic in the VPN.

In one exemplary embodiment, the network provider may use the dark address space to set a trap such as, for example, a decoy server/terminal or "a honeypot." The honeypot may be a server and/or a network of servers which is coupled to the Internet 20 and has been assigned to an unassigned VPN IP address. The honeypot may host the resource which was described above, and which has value in being probed, attacked and/or compromised by, for example, the hacker. Similar to the honeypot, the resource will be a decoy for hackers. Because the honeypot is controlled and monitored by the network provider, it may be set up to entice hackers but prevent their activity from having an adverse effect on the VPN 35 and/or any further VPN supported by the network provider. That is, information obtained by the honeypot may be shared by other VPNs maintained by the network provider. Those of skill in the art will understand that network provider may establish any number of honeypots in the VPN 35 with one or more resources hosted thereon.

The honeypot may serve several purposes. In one instance, the network provider may watch the hacker exploit any vulnerabilities of the VPN 35, thereby learning of weaknesses which need to be addressed and/or redesigned. Also, the honeypot allows the network provider to detect unauthorized access to the VPN 35 and terminate the corresponding connection(s) before the hacker gains access to the resource and/or root access to the VPN 35. Further, an analysis of the activity of the hacker may allow the network provider to design further VPNs with enhanced security. In any instance, a response by the network provider may be determined based on the classification of the network traffic.

FIG. 2 shows an exemplary embodiment of a method 200 for identifying the unauthorized network traffic using, for example, the honeypot. In step 205, the network provider creates the honeypot. As described above, the honeypot may be one server or a network of servers which hosts the resource. Preferably, the honeypot mimics a system which is likely to be the target of the hacker. For example, the network provider may utilize prior activity by hackers and/or information gathered from previously-used honeypots when creating the honeypot. In another embodiment, the honeypot may be created as a function of a particular hacker activity which is being detected (e.g., unauthorized access to executable code, password stealing, inserting malicious code, etc.).

In step 210, the honeypot is assigned to one of the unassigned VPN IP addresses. When the honeypot is assigned the VPN IP address, the honeypot may no longer be part of the dark address space. That is, upon gaining access to the VPN 35, the hacker will be tricked into thinking that the honeypot is an active part of the VPN 35 which includes the resource acting as the target of the hacker. As stated above, the network provider may choose to employ more than one honeypot, thereby detecting hacker activity at multiple locations at a single time.

In step 215, network traffic to the honeypot is analyzed. As known in the art, the honeypot may be installed behind a firewall which functions in a manner atypical of a conventional firewall. In this case, the firewall is permeable to all incoming traffic and restricts only outgoing traffic. Thus, the honeypot will receive all incoming traffic, and, as such, may be susceptible to one or more hackers. As understood by those of skill in the art, the network provider may install a false firewall to further trick the hacker.

In step 220, it is determined whether the traffic to the honeypot is unauthorized. That is, the classification for the traffic may be determined. In one embodiment, any traffic which is received by the honeypot may be determined to be unauthorized. In another embodiment, the traffic received by the honeypot must be greater than a predetermined threshold level before it will be determined to be unauthorized. For example, occasionally, a packet(s) may be misdirected by, for example, the VPN server 30 and/or a router in the VPN 35. The network provider may not be concerned with the misdirected traffic, because as understood by those of skill in the art, due to a size and configuration of the Internet 20, there may be instances of erroneous addressing and/or misdirection of packets. Thus, when the traffic received by the honeypot surpasses the predetermined threshold level, it may be determined that the traffic is unauthorized.

If the traffic is not unauthorized, the honeypot may continue to analyze traffic received thereby (step 215). In step 225, a predetermined response is executed based on the classification of the traffic. For example, when the traffic is unauthorized network traffic, the predetermined response may include an alert to the network provider and/or the nodes on the VPN 35. The alert may include an identity of a source of the unauthorized traffic and/or an instruction to heighten any security mechanisms which are currently used and/or executable by the nodes. The predetermined response may further include a reversion back to step 215. In this manner, the network provider may be alerted to the unauthorized traffic, but continue monitoring it to determine the source, a type of the target, what is happening to the target, how the traffic reached the VPN 35, etc. Thus, the network provider may allow the unauthorized traffic to continue while gathering information and diagnosing the security of the VPN 35.

In another embodiment, the network provider may take immediate action and terminate the unauthorized traffic. The network provider may take further steps to obtain ambient information regarding the unauthorized traffic. For example, the ambient information may include the source of the unauthorized traffic and attempt to prohibit the source from gaining access to the VPN 35 and/or the Internet 20. The ambient information may further include a nature, a type and/or a duration of the unauthorized traffic. In this manner, the information obtained from the honeypot may be shared with other VPNs and VPN servers utilized by the network provider. Thus, the network provider may provide additional security to each VPN it supports by sharing information generated by multiple honeypots.

The present invention may further allow the network provider to gather data regarding any network traffic in the VPNs which may enhance management thereof. For example, the ambient information may be obtained for any network traffic in the VPN. Other than unauthorized network traffic, the network traffic may include, but is not limited to, misdirected traffic, service request(s) and non-malicious traffic. Thus, while the present invention has been described with respect to the unauthorized traffic, those of skill in the art will understand that any network traffic in VPN and to the dark address space may be monitored and analyzed.

According to the present invention, the network provider may be present within the VPN 35 and proactively looking to attract and identify unauthorized traffic. A presence of the network provider in the VPN 35 may be transparent, such that a customer (e.g., the business) may be unaware of the presence. Similarly, the honeypot and/or any other trap utilized by the network provider may be tailored to the VPN 35. This feature may provide incentive for further businesses which are the subject of a particular type of attacks to have their VPNs hosted by the network provider. Thus, the present invention may add to the security and integrity of the VPN, and may provide a business advantage of transparent and customizable service to potential customers.

The present invention has been described with reference to specific exemplary embodiments. Those skilled in the art will understand that changes may be made in the details of the invention, without departing from the teaching of the invention. For example, although the present invention has been described with respect to the VPN, other networks may be utilized. Similarly, other traps and intruder detection mechanisms may be utilized in place of or in parallel with the honeypot. Accordingly, various modifications and changes may be made to the embodiments without departing from the broadest scope of the invention as set forth in the claims that follow. The specifications and drawing are, therefore, to be regarded in an illustrative rather than a restrictive sense.

What is claimed is:

1. A method, comprising:
   by a network server, monitoring network traffic received within a target virtual private network comprising a plurality of network addresses including a dark network address assigned to a trap;
   by the network server, determining that traffic directed to the dark network address is unauthorized network traffic, based on a traffic level of the traffic directed to the dark network address;
   by the network server, gathering data regarding the unauthorized network traffic including information on the exploitation of vulnerabilities of the target virtual private network; and
   by the network server, identifying a weakness of the virtual private network based on the information.

2. The method according to claim 1, further comprising: eliminating the weakness of the virtual private network.

3. The method according to claim 1, further comprising: after gathering the data, terminating a connection over which the unauthorized network traffic is received.

4. The method according to claim 1, wherein the trap is a honeypot.

5. The method according to claim 4, wherein the honeypot includes at least one of an application, an object, a document, a page, a file, a portion of computer code, a computational resource, a communication-type resource, a server and a network of servers.

6. The method according to claim 1, wherein the dark address is an unassigned network address from the plurality of network addresses.

7. A system, comprising:
a server coupled to a computer network, the server comprising a processor and non-transitory computer readable media containing instructions that, when executed by the processor, causes the processor to perform operations comprising:
monitoring network traffic received within a target virtual private network comprising a plurality of network addresses including a dark network address assigned to a trap;
determining that traffic directed to the dark network address is unauthorized network traffic, based on a traffic level of the traffic directed to the dark network address;
gathering data regarding the unauthorized network traffic including information on the exploitation of vulnerabilities of the target virtual private network; and
identifying a weakness of the virtual private network based on the information.

8. The system according to claim 7, further comprising:
eliminating the weakness of the virtual private network.

9. The system according to claim 7, further comprising:
after gathering the data, terminating a connection over which the unauthorized network traffic is received.

10. The system according to claim 7, wherein the trap is a honeypot.

11. The system according to claim 10, wherein the honeypot includes at least one of an application, an object, a document, a page, a file, a portion of computer code, a computational resource, a communication-type resource, a server and a network of servers.

12. The system according to claim 7, wherein the dark address is an unassigned network address from the plurality of network addresses.

13. The system according to claim 7, wherein the computer network is a virtual private network.

14. A non-transitory computer-readable medium having stored thereon computer readable instructions for monitoring network traffic, wherein execution of the computer readable instructions by a processor causes the processor to perform operations comprising:
monitoring network traffic received within a target virtual private network comprising a plurality of network addresses including a dark network address assigned to a trap;
determining that traffic directed to the dark network address is unauthorized network traffic, based on a traffic level of the traffic directed to the dark network address;
gathering data regarding the unauthorized network traffic including information on the exploitation of vulnerabilities of the target virtual private network; and
identifying a weakness of the virtual private network based on the information.

15. The non-transitory computer-readable medium according to claim 14, further comprising:
eliminating the weakness of the virtual private network.

16. The non-transitory computer-readable medium according to claim 14, further comprising:
after gathering the data, terminating a connection over which the unauthorized network traffic is received.

17. The non-transitory computer-readable medium according to claim 14, wherein the trap is a honeypot.

18. The non-transitory computer-readable medium according to claim 17, wherein the honeypot includes at least one of an application, an object, a document, a page, a file, a portion of computer code, a computational resource, a communication-type resource, a server and a network of servers.

19. The non-transitory computer-readable medium according to claim 14, wherein the dark address is an unassigned network address from the plurality of network addresses.

20. The non-transitory computer-readable medium according to claim 14, wherein the computer network is a virtual private network.

* * * * *